March 2, 1943. W. L. KAUFFMAN, 2D 2,312,762
WRINGER
Filed Oct. 5, 1939
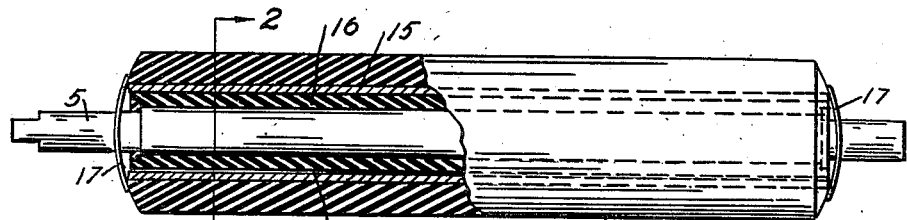
FIG. 1.
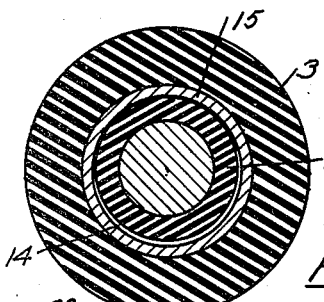
FIG. 2.
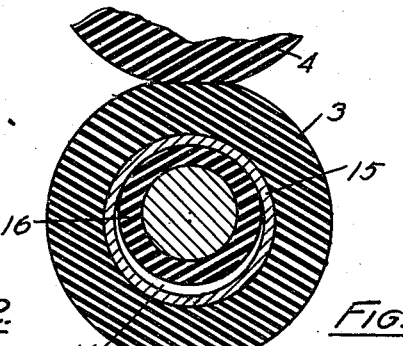
FIG. 3.
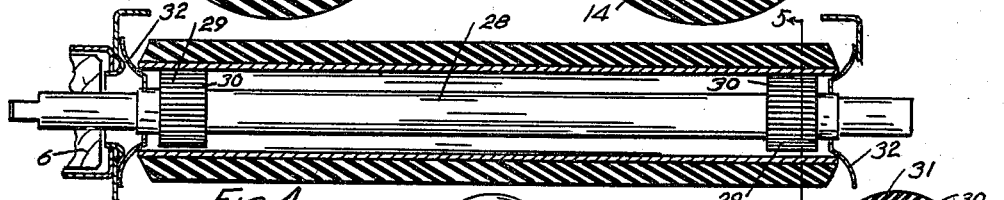
FIG. 4.
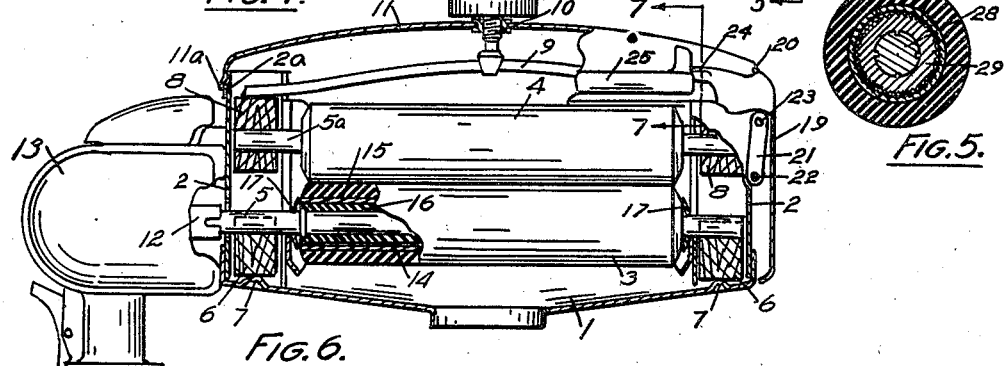
FIG. 5.
FIG. 6.
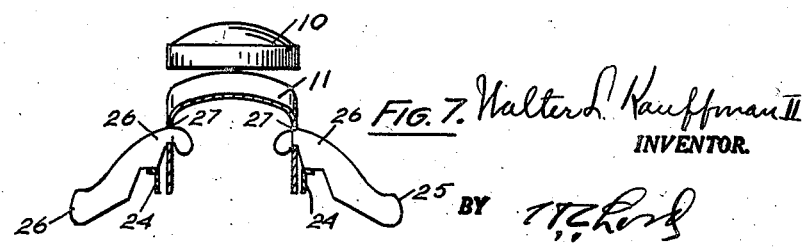
FIG. 7.
Walter L. Kauffman II
INVENTOR.
BY
ATTORNEYS.

UNITED STATES PATENT OFFICE 2,312,762

WRINGER

Walter L. Kauffman, II, Erié, Pa., assignor to Lovell Manufacturing Company, Erie, Pa., a corporation of Pennsylvania Application October 5, 1939, Serial No. 298,095

4 Claims. (Cl. 68—253)

The present invention is designed to provide, as a safety means, a structure which will disconnect the driving force from the roll when the pressure on the rolls is released. Ordinarily a wringer so arranged would be provided with a safety release which would immediately release the pressure on the rolls and this, with the present construction, stops the driving force on the rolls so that there may be no continued injury to the operator even if the pressure is released. Features and details of the invention will appear from the specification and claims.

Preferred embodiments of the invention are illustrated in the accompanying drawing as follows:

Fig. 1 shows an elevation of a drive roll partly in section.

Fig. 2 a section on the line 2—2 in Fig. 1, with pressure released.

Fig. 3 a similar section with the roll under pressure.

Fig. 4 a sectional view of an alternative construction for a drive wringer roll.

Fig. 5 a section on the line 5—5 in Fig. 4.

Fig. 6 an elevation, partly in section, of a wringer embodying the invention.

Fig. 7 a section on the line 7—7 in Fig. 6.

1 marks a base of a wringer, 2—2 stiles of the frame, 3 and 4 wringer rolls, 5 a drive shaft of the lower roll, 5a a shaft for the upper roll, 6 a bearing in which the shaft 5 is journaled, the bearing being supported by a projection 7 on the base, 8 bearings in which the shaft 5a is journaled, these bearings being slidingly mounted in the side stiles, 9 a spring resting on the upper bearings, 10 an adjusting screw for the spring, 11 a top bar in which the screw is arranged.

The shaft 5 is driven from a driving connection 12 leading from the ordinary drive mechanism 13. These parts are, or may be, of common construction, outside of the lower roll.

The lower roll 3 has an opening 14 extending through it. Preferably the body of the roll is formed of resilient material such as rubber. The inner wall of the roll is formed of less resilient material than the body of the roll, preferably formed with a metal tube 15 to which the resilient material is bonded. The shaft 5 comprises a rubber wall 16 which is bonded to the metal shaft. The diameter of the shaft, including the rubber portion 16 is slightly smaller or at least provides a loose relation between the shaft and the inner wall of the tube 15.

When the pressure on the roll is released, the roll is free to rotate on the shaft, except for the slight frictional engagement due to the weight of the rolls. When pressure is exerted on the rolls, the inner surface of the tube 15 is pressed into driving engagement with the outer surface of the rubber wall 16, thus providing a driving relation by means of which the lower roll is driven. Washers 17 are arranged at the ends of the roll. These washers are threaded on the shaft and are concave on their inner surfaces. The outer edges of these washers engage the shaft or slightly engage the ends of the rolls with a centering surface. Ordinarily when the pressure is released, these washers tend to center the roll and consequently to reduce the friction that may be produced by the weight of the rolls. They not only effect the centering but due to their engagement with the frame and the slight pressure give a retarding effect which, under ordinary conditions, stops the roll when pressure is released.

The wringer may be provided with any release device. As shown, the top bar has a shoulder 11a engaging a lip 2a on one of the stiles, and the opposite end of the wringer is provided with a resetting lever 19 hinged to the top bar at 20. A link 21 is pivotally connected at 22 to the lever and at 23 to the side stile. These pivots 20, 22 and 23 are close to alignment, but have a slightly stable arrangement.

An arm 24 extends from the reset lever into the path of an arm 26 of a trip bar 25. The trip bar has arms 26 at each end which hook into openings 27 in the face of the top bar. When the trip bar is depressed, the arms 26 acting on the projecting arm 24 of the reset lever, move the reset lever to unstable position and effect a release, thus relieving the rolls of pressure.

In Figs. 4 and 5 an alternative construction is illustrated. In this the shaft 28 is provided with sleeves 29 which are hardened and provided with serrations 30 on their outer peripheries. These serrations engage the inner surface of the tube 15 and in operation form slight indentations 31. Centering washers 32 in this case have the concave portions toward the rolls, the inner part of the washers entering the tube 15 and the outer part of the washers having a slope engaging an annular rib on the guard or frame of the wringer. The operation of this device is, in general, the same as that in the construction illustrated in Figs. 1, 2, 3, and 6.

What I claim as new is:

1. In a wringer having a frame, wringer rolls of resilient material, pressure devices exerting pressure between the rolls, and means releasing the roll pressure, the combination with one of the rolls of a tube of rigid material on which the roll is bonded and a drive shaft extending through the tube with a loose relation said drive shaft extending beyond the ends of said one roll, said tube and shaft having surfaces engaging each other, said surfaces extending parallel to the axes of said tube and shaft said shaft sustaining the roll pressure and driving the roll when under pressure through said engaging surfaces, the release of pressure on the rolls relieving the driving engagement between the shaft and the tube.

2. In a wringer having a frame, wringer rolls of resilient material, pressure devices exerting pressure between the rolls, and means releasing the roll pressure, the combination with one of the rolls of a tube of rigid material on which the roll is bonded and a drive shaft extending through the tube with a loose relation, said shaft sustaining the roll pressure and driving the roll when under pressure through its engagement with the tube, the release of pressure on the rolls relieving the driving engagement between the shaft and the tube, and centering washers at the ends of the roll having the included tube yieldingly permitting the offsetting of the tube to move into driving engagement and yieldingly returning the tube to center position out of driving engagement when the pressure is released.

3. In a wringer having a frame, wringer rolls of resilient material, pressure devices exerting pressure between the rolls, and means releasing the roll pressure, the combination with one of the rolls of a tube of rigid material on which the roll is bonded and a drive shaft extending through the tube with a loose relation said drive shaft extending beyond the ends of said one roll, said tube and shaft having surfaces engaging each other, said surfaces extending parallel to the axes of said tube and shaft said shaft sustaining the roll pressure and driving the roll when under pressure through said engaging surfaces, the release of pressure on the rolls relieving the driving engagement between the shaft and the tube, and means retarding the roll having the included tube when pressure is released.

4. In a wringer having a frame, wringer rolls of resilient material, pressure devices exerting pressure between the rolls, means releasing the roll pressure, the combination with one of the rolls of a tube of rigid material on which the roll is bonded and a drive shaft extending through the tube with a loose relation, said shaft sustaining the roll pressure and driving the roll when under pressure through its engagement with the tube, the release of pressure on the rolls relieving the driving engagement between the shaft and the tube, and centering and retarding washers engaging the ends of the roll having the included tube.

WALTER L. KAUFFMAN, II.